United States Patent [19]

Banba

[11] 4,434,009

[45] Feb. 28, 1984

[54] POLYMER-COATED METALLIC PIGMENTS

[75] Inventor: Toshiaki Banba, Yamato Koriyama, Japan

[73] Assignee: Toyo Aluminium Kabushiki Kaisha, Osaka, Japan

[21] Appl. No.: 327,203

[22] Filed: Dec. 3, 1981

[51] Int. Cl.³ ............................................... C09C 1/62
[52] U.S. Cl. .................................. 106/290; 106/291; 106/308 M; 428/407
[58] Field of Search ................. 106/290, 291, 308 M; 428/407

[56] References Cited

U.S. PATENT DOCUMENTS

| | | | |
|---|---|---|---|
| 3,575,900 | 4/1971 | Ponyik | 106/290 |
| 3,697,070 | 10/1972 | McAdow | 106/291 |
| 3,897,586 | 7/1975 | Coker | 428/407 |
| 3,935,340 | 1/1976 | Yamaguchi et al. | 428/407 |
| 3,949,139 | 4/1976 | Dunning et al. | 106/290 |
| 4,213,886 | 7/1980 | Turner | 106/290 |

Primary Examiner—James Poer
Attorney, Agent, or Firm—Armstrong, Nikaido, Marmelstein & Kubovcik

[57] ABSTRACT

Polymer-coated metallic pigments for paints are proposed which comprise metallic pigment particles coated with a polymer. They are particularly suitable for use with paints for electrostatic painting, water-based paints, and paints for plastics. They may comprise a silicone compound.

15 Claims, No Drawings

POLYMER-COATED METALLIC PIGMENTS

The present invention relates to polymer-coated metallic pigments used particularly to produce paints for electrostatic painting, water-based paints, and paints for plastic products, and to a process for producing the same.

Metallic pigments have been widely used to prepare paints for construction materials, light electrical appliances, machinery, ships, vehicles, automobiles, etc. and to prepare inks for printing on paper and plastic materials. On the other hand, electrostatic painting, painting using water-based paints, and painting on plastic materials are highlighted in recent years for better painting efficiency and pollution-free cleanliness.

However, the use of the conventional metallic pigments for such new types of painting is attended with various problems. In the electrostatic painting, because of poor withstand voltage of the conventional metallic pigments, the application of high voltage required for this type of painting causes a heavy current leakage. Also, when used for water-based paints, the conventional metallic pigments react with water during storage to produce hydrogen gas because of poor water resistance so that the paint would lose its metallic luster and blacken. In the plastic painting, baking finish cannot be used because of low heat resistance of the plastics to be painted and the paint containing the conventional metallic pigment cannot but be dried at low temperature, usually at 50°–60° C. This results in poor cohesion of the paint film and particularly in poor affinity between the metallic pigment and the binder in the paint film in comparison with the baked film, even if the most suitable combination of binder and organic solvent is selected. The metallic pigments usually used for plastic painting are in the form of flakes and they are normally coated with fatty acids. If the conventional metallic pigments are used for plastic painting, they exhibit poor orientation uniformity and poor cohesion in the paint film because of their poor affinity with the binder. The property for preventing such problems is hereinafter referred to as the peelproofness.

Another problem is that shock due to static electricity is sometimes felt when one touches a metallic coat on an apparatus containing a high voltage generator, such as a TV set. The property of preventing such a phenomenon is hereinafter referred to as the shockproofness.

Another requirement for the plastic painting is touchproofness. This is related to the fact that the paint film is dried not by baking but at low temperatures. A fingerprint remains on the paint film and the touched portion becomes white. The cause for this phenomenon has not been fully clarified, but a microscopic examination shows that the metallic pigment at the touched portion corrodes and minute cracks appear on the binder. On a paint film having a good touchproofness, no fingerprint is left.

It is an object of the present invention to provide metallic pigments which obviate such shortcomings and to provide a process for producing the same.

The present invention consists in polymer-coated metallic pigments for paints comprising metallic pigment particles coated with a polymer in the amount of 0.1 to 30 parts by weight in relation to 100 parts by weight of the metallic component in the metallic pigment particles. The polymer is obtained by polymerizing a monomer (hereinafter referred to as "monomer A") having a polymerizable double bond and at least one epoxy radical, singly or with at least one comonomer (hereinafter referred to as "comonomer B") having a polymerizable double bond.

The metallic particles used in the present invention may be aluminum, copper, zinc, iron, nickel or their alloys. They are usually flaky in shape, but it is not our intention to limit to that shape.

The monomer "A" may be selected from among epoxidated polybutadiene, glycidyl methacrylate, glycidyl, acrylate, cyclohexenevinyl monoxide, divinylbenzene monoxide, etc.

The polymerizable comonomer "B" may be styrene, α-methylstyrene, vinyltoluene, acrylonitrile, methacrylonitrile, vinylacetate, vinylpropionate, acrylic acid, acrylic ester, methacrylic acid, methacrylic ester, crotonic acid, itaconic acid, citraconic acid, oleic acid, maleic acid, maleic anhydride, divinylbenzene, etc.

Among acrylic esters which can be used, there are methyl acrylate, ethyl acrylate, n-butyl acrylate, 2-ethylhexyl acrylate, lauric acrylate, stearyl acrylate, hydroxyethyl acrylate, hydroxypropyl, acrylate, methoxyethyl acrylate, butoxyethyl acrylate, cyclohexyl acrylate, 1,6-hexanedioldiacrylate, and 1,4-butanedioldiacrylate.

Among methacrylic esters which can be used, there are methyl methacrylate, ethyl methacrylate, n-butyl methacrylate, 2-ethylhexyl methacrylate, lauric methacrylate, stearyl methacrylate, hydroxyethyl methacrylate, hydroxypropyl methacrylate, methoxyethyl methacrylate, butoxyethyl methacrylate, and cyclohexyl methacrylate.

In accordance with the present invention, the coating of the metallic pigment particles with a polymer is performed by dissolving a monomer A or a mixture of a monomer A and a comonomer B in an organic solvent, dispersing the metallic particles in the solution, heating the reaction system to a predetermined temperature, and adding a polymerization initiator to start polymerization. By this process, a polymer is deposited on the metallic particles. After reaction, the metallic pigment thus coated is filtered, concentrated and separated from the reaction system.

As the organic solvent, mineral spirit is preferable. However, the following may be used: aliphatic hydrocarbons such as hexane, heptane, octane and cyclohexane; aromatic hydrocarbons such as benzene, toluene and xylene; halides such as chlorobenzene, trichlorobenzene, trichloroethylene and tetrachloroethylene; alcohols such as methyl alcohol, ethyl alcohol, n-propyl alcohol, n-butyl alcohol; ketones such as 2-propanone and 2-butanone; esters such as ethylacetate and propylacetate; and tetrahydrofuran, diethyl ester, and ethylpropyl ester.

As a polymerization initiator, organic peroxides such as di-t-butyl peroxide, acetyl peroxide, benzoyl peroxide, lauroyl peroxide, cumyl hydroperoxide, and t-butyl hydroperoxide; and azo compounds such as $\alpha,\alpha'$-azobisisobutyronitrile may be used. But, the last-mentioned is the most preferable because it is pyrolyzed at relatively low temperatures.

The reaction temperature for polymerization should be 60°–200° C. If $\alpha,\alpha'$-azo-bisisobutyronitrile is used, it should be 70°–90° C. For lower or higher temperatures beyond that range, the reaction speed or the polymerization efficiency would decrease.

The polymerization should preferably be performed under atmosphere of an inert gas such as nitrogen, helium and argon for higher polymerization efficiency.

The amount of the polymer coated on the metallic pigment particles should be 0.1-30 parts by weight, preferably 0.5-15 parts by weight, in relation to 100 parts by weight of the metallic component in the metallic pigment particles. For less than 0.1 part, the aimed advantages could not be obtained. For more than 30 parts, merely the manufacturing cost increases without any substantial increase in the performance or function.

The ratio by weight of the monomer A to the comonomer B should preferably be 3:10 to 10:10 because such a ratio gives the polymer obtained a higher cross-linking density, thus giving the final product better performances required for use as metallic pigment for paints.

In order to make the polymer-coated metallic pigment dispersible in water, a suitable amount (about 10-16 weight % to the non-volatile component in the pigment) of a known surface active agent should be added thereto. The surface active agent may be either an anionic one such as fatty acid soaps, long chained alcohol sulfate, polyoxyethylene alkylether sulfate, polyoxyethylene isooctylphenylether sulfonate, and alkylbenzene sulfate, or a nonionic one such as polyoxyethylene alkylether, polyoxyethylene alkylphenolether, polyoxyethylene alkylamide, polyoxyethylene fatty acid ester, polyoxyethylene sorbitan fatty acid ester, and sorbitan fatty acid ester.

If it is desired to give a good touchproofness to the paint film on a plastic material, a silicone compound should be added to the polymer-coated metallic pigment thus obtained. Further, its addition gives a good wettability to the surface of the paint film, thus allowing the use for printing. The addition of silicone compound should be done by dissolving a silicone compound in a medium such as mineral spirit and diluting the solution and adding it to the polymer-coated pigment in an ordinary mixing step for adjusting the volatile to non-volatile ratio.

The amount of addition should be 0.5-5.4 parts by weight in relation to 100 parts by weight of the non-volatile component in the polymer-coated metallic pigment. For less than 0.5 part, the touchproofness would be insufficient. For more than 5.4 parts, it would be sufficient but the cost would be higher and the paint film obtained would not be suitable for printing.

If a metallic tone of color is required for the paint film used for plastic painting, the amount of the polymer coated on the metallic pigment should be 0.5-3 parts by weight.

The silicone compound used in the present invention may be either a silicone oil or a silicone resin. The usable silicone oil include dimethyl polysiloxane, epoxy-modified silicone oil and carboxy-modified silicone oil. The silicone resin may be any known one.

The polymer-coated metallic pigment in accordance with the present invention shows different advantages for different amounts of coating of the polymer as follows:

If the amount of coating on the metallic pigment is 1.5 parts by weight or more, preferably 3 parts or more, to 100 parts of the metallic component in the metallic pigment, the paint obtained exhibits a good withstand voltage and can be used for the electrostatic painting.

If the amount of coating is 0.5 part or more, preferably 1 part or more, the paint obtained exhibits a good water stability when used as a water-based paint. This property is checked by testing for the amount of gas generated and the change in tone of color.

If it is 0.1 part or more, preferably 0.5 part or more, the paint obtained exhibits a good peelproofness. If it is 3 parts or more, preferably 7 parts or more, a good shockproofness can be expected. If a silicone compound is added to the polymer-coated metallic pigment, a good touchproofness is obtained.

To further illustrate this invention, and not by way of limitation, the following examples are given. Unless otherwise stated, quantities are expressed as parts by weight.

EXAMPLES 1-8

One thousand grams of mineral spirit was put in a 2-liter four-neck flask. The monomer A or a combination of monomer A and comonomer B as shown in the Table on the last page of applicant's specification and the claims were added thereto and agitated in the flask. (In the Table, EPPB, GMA, GA, 1.6-, and AA are abbreviations for epoxidated polybutadiene, glycidyl methacrylate, glycidyl acrylate, 1,6-hexanedioldiacrylate, and acrylic acid, respectively.) Aluminum flakes were added to the solution and agitated to disperse them uniformly. The aluminum flakes used were HS-2, 1200M and MG-1000, all manufactured by Toyo Aluminium Co., Ltd. (In the Table, NV denotes the weight % of the non-volatile component contained therein.) The reaction system was heated to a predetermined temperature under nitrogen gas atmosphere. One gram of $\alpha,\alpha'$-azobisisobutyronitrile was then added and the system was allowed to polymerize. The reaction temperature and reaction time are shown in the Table. After reaction, by filtering and concentrating the mixture, a polymer-coated aluminum pigment was obtained. The weight % of the non-volatile component (NV) in the pigment obtained is shown in the Table.

To determine the amount of polymer coated on the pigment, part of the pigment obtained was washed with n-hexane, filtered and powdered, and the metallic component in the pigment powder was dissolved off with a solution consisting of hydrochloric acid, nitric acid and water in the ratio by weight of 1:1:2. The polymer residue was filtered, dried and weighed. The amount of polymer coated is shown in the Table in parts by weight in relation to 100 parts of the non-volatile component in the polymer-coated pigment.

The pigment obtained was subjected to mixing by use of a mixer to adjust the percentage of the non-volatile component. In Example 8, epoxy-modified silicone oil (SF-8411, manufactured by Toray Silicone Co.) was added as a silicone compound to the pigment and the mixture underwent mixing. In the Table, the amount of SF-8411 is shown in part by weight to 100 parts of non-volatile component in the pigment. The percentage of the non-volatile component (NV) after the mixing is shown in the Table.

CONTROLS 1 AND 2

The control 1 was aluminum pigment (HS-2, Toyo Aluminium Co., Ltd.), not coated with a polymer. The control 2 is the control 1 to which a silicone compound SF-8411 was added as in Example 8.

The polymer-coated pigments after mixing and the pigments not coated as the controls were tested for the following six tests. The results of tests are shown in the Table.

TEST 1

(Electrostatic Painting Test)

From the pigments obtained the sample paints were prepared as follows: 80 parts of acryl varnish (Acrydic 47-712, manufactured by Japan Reichhold Chemicals Inc. NV 50%) and 20 parts of melamine (Super Beckamine J-820 of the same maker, NV 60%), both being binders, were mixed so that the metallic component in the pigment would be 15 parts by weight in relation to 100 parts of the solid component in the binder. The mixture was diluted with a solvent consisting of xylene, methyl isobutyl ketone and diacetone alcohol in the ratio by weight of 60:25:15 so that the viscosity measured with the Ford cup No. 4 would be 12 seconds. The paint thus made was painted on a tinplate by use of a Grooved Mini-Bell electrostatic painting device (manufactured by Ransburg Japan Ltd.) at a voltage of 90 KV and at a paint supply rate of 200 cc per minute.

TEST 2

(Gas Evolution Test)

3 Grams of each sample metallic pigment (in terms of its metallic component) was dispersed in 100 grams of an aqueous medium consisting of water and butyl cellosolve in the ratio by weight of 1:4. The dispersion was kept at 50° C. for 24 hours and the amount of gas evoluted from the dispersion was measured. It is shown in the Table in milliliter in relation to one gram of the metallic component in the pigment.

TEST 3

(Color Difference Test)

One hundred parts of each polymer-coated aluminum pigment was kneaded with 3 parts of polyoxyethylene alkylphenolether (Emalgen 906 of KaO Sekken Co.) and 6 parts of polyoxyethylene alkylether. (Emalgen 408 of KaO Sekken Co.) To 48 g of the water-dispersible aluminum pigment thus obtained, 90 g of distilled water, 560 g of water-soluble acryl varnish (Arolon 557N of Nisshoku Arrow Chemical Co., NV 50%), 150 g of water-soluble melamine varnish (Sumimal M-50W of Sumitomo Chem. Co., Ltd., NV 78%), and 32 g of phthalocyanine blue (NK blue of Dainippon Ink Co.) were added and mixed. The water-dispersible metallic paint thus obtained was kept at 50° C. for one month.

The paints before and after the storage were painted with a doctor blade on a test paper sheet and the difference ΔE in color was measured by use of a differential colorimeter.

TEST 4

(Peelproofness Test)

To 100 g of acryl lacquer (Acrydic A-166 of Japan Reichhold Chemicals Inc. NV 50%) was added 5 g (in terms of metallic component) of each aluminum pigment obtained. The mixture was diluted with a solvent consisting of toluene and n-butyl alcohol in the ratio of 9:1 so that the viscosity measured with the Ford cup No. 4 would be 16 seconds. The paint thus prepared was sprayed onto a polystyrene plate and dried at 50° C. for ten minutes to obtain a paint film about 10 microns thick. It was checked for peelproofness by use of a cellophane adhesive tape 15 mm wide by seeing if the pigment was not transferred to the tape when the latter was removed. This test is to check for the affinity between the binder and the metallic pigment.

TEST 5

(Shockproofness Test)

The paint film obtained in Test 4 was tested for shockproofness with a withstand voltage tester. Voltage was applied to the paint film through the electrodes spaced by 1 cm. It was increased from 1 KV to 6 KV step by step to check at what voltage an insulation breakdown occurred. In the Table is shown the maximum voltage applied without causing any breakdown.

TEST 6

(Touchproofness Test)

A part of the aluminum pigment obtained in Example 8 was mixed with 35 parts of acryl lacquer (Acrydic A-165 of Japan Reichhold Chemicals Inc. NV 45%) and 62 parts of a solvent consisting of ethyl acetate, ethyl cellosolve and cyclohexane in the ratio of 40:30:30. The metallic paint obtained was sprayed onto a polystyrene plate and dried at 50° C. for 20 minutes to prepare a metallic paint film about 10 microns thick. A finger was pressed on the surface of the paint film and it was let to stand for ten days at 40° C. and a relative humidity of 90%. Thereafter, the paint surface was examined for change.

TABLE

| | Control 1 | Control 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Monomer A | — | — | EPPB 5.4 g | EPPB 1.3 g | EPPB 3.0 g | EPPB 3.5 g | GMA 6.5 g | EPPB 12 g | GA 56 g | EPPB 1.3 g |
| Comonomer B | — | — | — | 1,6- 2.2 g AA 0.8 g | 1,6- 1.5 g AA 0.9 g | 1,6- 5.1 g AA 1.4 g | 1,6- 9.5 g AA 2.5 g | 1,6- 12 g AA 5 g | — | 1,6- 2.2 g AA 0.8 g |
| Al flakes (NV in wt %) | HS-2 (72.0) | HS-2 (72.0) | 1200 M (65.0) 280 g | HS-2 (72.0) 250 g | MG-1000 (71.3) 250 g | HS-2 (72.0) 250 g | MG-1000 (72.0) 250 g | HS-2 (72.0) 250 g | 1200 M (65.0) 280 g | HS-2 (72.0) 250 g |
| Temp. × Time (hr) | — | — | 70° C. × 8H | 80° C. × 6H | 90° C. × 4H | 80° C. × 6H | 90° C. × 4H | 90° C. × 4H | 70° C. × 8H | 80° C. × 6H |
| NV (in wt %) of Al pigment | — | — | 70.3 | 73.0 | 70.5 | 67.0 | 61.0 | 68.5 | 58.0 | 73.0 |
| Amount of coating (in wt part) | — | — | 0.4 | 0.7 | 1.7 | 3.2 | 7.3 | 11.2 | 26.5 | 0.7 |
| Silicone compound (in wt part) | — | SF-8411 1.5 | — | — | — | — | — | — | — | SF-8411 1.0 |
| NV (in wt %) after mixing | 72.0 | 72.5 | 55.3 | 65.1 | 65.7 | 60.0 | 58.1 | 54.7 | 50.2 | 65.9 |
| Test 1 | X | X | X | X | O | O | O | O | O | X |
| 2 (in ml) | >20 | >20 | 20 | 5 | 2 | 0 | 0 | 0 | 0 | — |
| 3 | 3.5 | 3.5 | 2.1 | 1.4 | 1.3 | 0.5 | 0.5 | 0.2 | 0.3 | 1.6 |
| 4 | X | X | Δ | O | O | O | O | O | O | O |
| 5 (in KV) | 0 | 0 | 0 | 1 | 2 | 4 | >6 | >6 | >6 | 1 |

TABLE-continued

| | Control 1 | Control 2 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- | --- |
| 6 | X | X | Δ | Δ | Δ | Δ | Δ | Δ | Δ | O |

O: Good
Δ: Not good but usable
X: Not usable

What we claim are:

1. A metallic pigment for paints comprising metallic pigment particles directly coated with a polymer obtained by polymerizing a monomer having a polymerizable double bond and at least one epoxy radical or a mixture of said monomer and a comonomer having a polymerizable double bond in the amount of 0.1 to 30 parts by weight in relation to 100 parts by weight of the metallic component in the metallic pigment particles.

2. The metallic pigment as claimed in claim 1 wherein said metallic pigment particles are aluminum flakes.

3. The metallic pigment as claimed in claim 1 or 2 wherein the amount of said polymer coated is 0.5 to 15 parts by weight in relation to 100 parts by weight of the metallic component in the metallic pigment.

4. The metallic pigment for paints as claimed in claim 1 wherein said metallic pigment further comprises 0.5–5.4 parts by weight of a silicone compound in relation to 100 parts by weight of non-volatile component in the polymer-coated metallic pigment.

5. The metallic pigment as claimed in claim 4 wherein said metallic pigment particles are aluminum flakes.

6. The metallic pigment as claimed in claim 4 or 5 wherein the amount of said polymer coated is 0.5 to 3 parts by weight in relation to 100 parts by weight of the metallic component in the metallic pigment.

7. A process for producing a metallic pigment for paints comprising the steps of:
dissolving in an organic solvent a monomer having a polymerizable double bond and at least one epoxy radical or a mixture of said monomer and a comonomer having a polymerizable double bond, dispersing metallic pigment particles in said solution, and polymerizing said monomer or said mixture at a temperature of 60°–200° C. in the presence of a polymerization initiator so that the polymer produced will be directly deposited on said metallic pigment particles.

8. The process as claimed in claim 7 wherein the ratio by weight of said monomer to said comonomer is 3:10 to 10:10.

9. The process as claimed in claim 7 or 8 wherein said monomer is epoxidated polybutadiene and said comonomers are 1,6-hexanedioldiacrylate and acrylic acid.

10. The process as claimed in claim 7 wherein said metallic pigment particles are aluminum flakes.

11. The process as claimed in claim 7 further comprising the step of adding to the polymer-coated metallic pigment 0.5 to 5.4 parts by weight of a silicone compound in relation to 100 parts by weight of the non-volatile component in the polymer-coated metallic pigment.

12. The process as claimed in claim 11 wherein said silicone compound is silicone oil.

13. The process as claimed in claim 11 wherein said silicone compound is silicone resin.

14. The metallic pigment for paints as claimed in claim 4, wherein said silicone compound is silicone oil.

15. The metallic pigment as claimed in claim 4, wherein said silicone compound is silicone resin.

* * * * *